Figure 1:
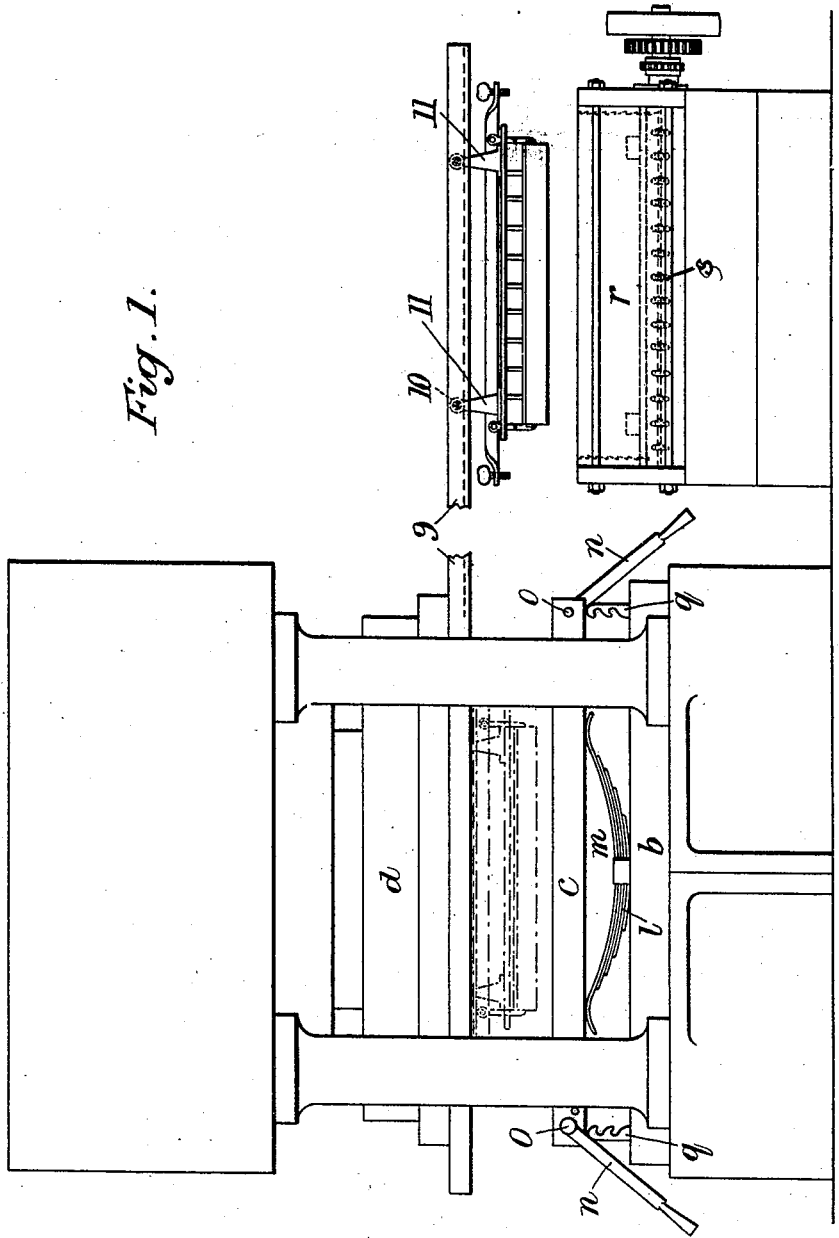

No. 773,671. PATENTED NOV. 1, 1904.
T. J. PALMER.
MANUFACTURE OF MOLDED OR EMBOSSED PANELS OR THE LIKE.
APPLICATION FILED APR. 29, 1904.
NO MODEL. 9 SHEETS—SHEET 1.

No. 773,671. PATENTED NOV. 1, 1904.
T. J. PALMER.
MANUFACTURE OF MOLDED OR EMBOSSED PANELS OR THE LIKE.
APPLICATION FILED APR. 29, 1904.
NO MODEL. 9 SHEETS—SHEET 4.

WITNESSES
F. W. Wright
Walter Abb

INVENTOR
Thomas John Palmer
BY Howson and Howson
ATTORNEYS

No. 773,671. PATENTED NOV. 1, 1904.
T. J. PALMER.
MANUFACTURE OF MOLDED OR EMBOSSED PANELS OR THE LIKE.
APPLICATION FILED APR. 29, 1904.
NO MODEL. 9 SHEETS—SHEET 5.

WITNESSES

INVENTOR
Thomas John Palmer
BY
Howson and Howson
ATTORNEYS

No. 773,671. PATENTED NOV. 1, 1904.
T. J. PALMER.
MANUFACTURE OF MOLDED OR EMBOSSED PANELS OR THE LIKE.
APPLICATION FILED APR. 29, 1904.
NO MODEL. 9 SHEETS—SHEET 6.

WITNESSES
F. W. Wright
Walter Abbe

INVENTOR
Thomas John Palmer
BY
Howson and Howson
ATTORNEYS

No. 773,671. PATENTED NOV. 1, 1904.
T. J. PALMER.
MANUFACTURE OF MOLDED OR EMBOSSED PANELS OR THE LIKE.
APPLICATION FILED APR. 29, 1904.
NO MODEL. 9 SHEETS—SHEET 7.

WITNESSES
F. W. Wright.
Walter Abbe

INVENTOR
Thomas John Palmer
BY
Howson and Howson
ATTORNEYS

No. 773,671.                                            Patented November 1, 1904.

UNITED STATES PATENT OFFICE.

THOMAS JOHN PALMER, OF SOUTHPORT, ENGLAND.

MANUFACTURE OF MOLDED OR EMBOSSED PANELS OR THE LIKE.

SPECIFICATION forming part of Letters Patent No. 773,671, dated November 1, 1904.

Application filed April 29, 1904. Serial No. 205,537. (No model.)

*To all whom it may concern:*

Be it known that I, THOMAS JOHN PALMER, anaglyph manufacturer, a subject of the King of Great Britain and Ireland, residing at 36 Arbour street, Southport, in the county of Lancaster, England, have invented certain new and useful Improvements Relating to the Manufacture of Molded or Embossed Panels or the Like, of which the following is a specification.

My invention relates to the manufacture of molded or embossed panels and the like, and more especially to the manufacture of panels and the like having designs in relief for decorative or other purposes—such, for example, as for advertising purposes; and the object of my invention is to enable such articles to be manufactured with greater convenience, more economically and expeditiously, with a minimum of hand-labor and with greater sharpness in the details of the design than hitherto and with any desired relief and (when the articles are hollow at the back) so that the thickness or density of the material can be readily made in accordance with the projection in various parts of the relief-work in the design.

For the purposes of description I will presume that the articles to be produced are panels for decorative purposes—such as for application to walls, ceilings, and the like—as from the description of the invention as so applied its general application will also be understood.

According to my invention, I make the panels from a pulp made from paper-making materials or materials which can be made into a pulp with water or other liquid with or without the admixture of materials which will waterproof or fireproof or both waterproof and fireproof the panels, and in making the said pulp I use sufficient liquid to make it of such a fluid consistency that it will readily pass into the recesses in a pattern-plate which forms the required design, so as to penetrate into the minutest details of the recesses forming the design. I then exert pressure upon the fluid pulp in such a way and by the use of such means that the liquid is removed from the pulp, while the fibrous or solid matter of the pulp remains and forms the required panel.

It is understood in the following description that where wire gauzes or structures or perforated bodies in conjunction with felt or the like are used to afford passages for liquid that the felt or a layer of the felt is next to the pulp, so as to prevent the solid matter or fibers of the pulp from entering the passages afforded by the said wire gauzes or structures or perforated bodies.

Preferably the fluid pulp is delivered onto the pattern-plate in predetermined quantities and in such manner as to be quickly and evenly distributed upon every portion of the plate, or in some cases the fluid pulp may be so delivered onto a plain plate or bed and the pattern-plate be pressed into it while thereon.

Figure 2:
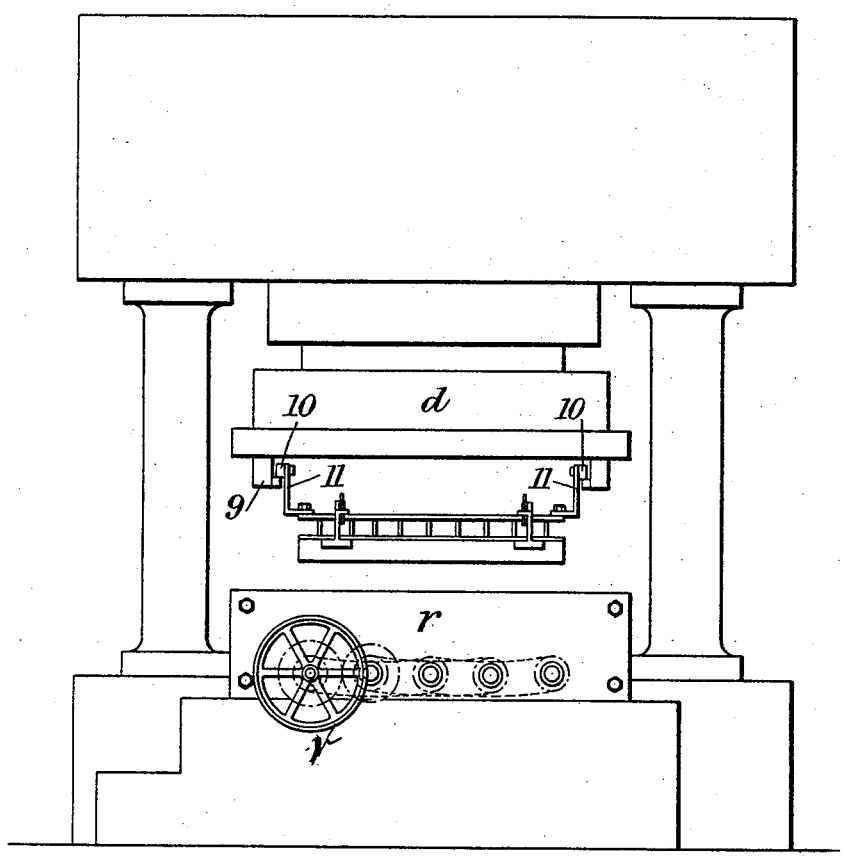
Figure 3:
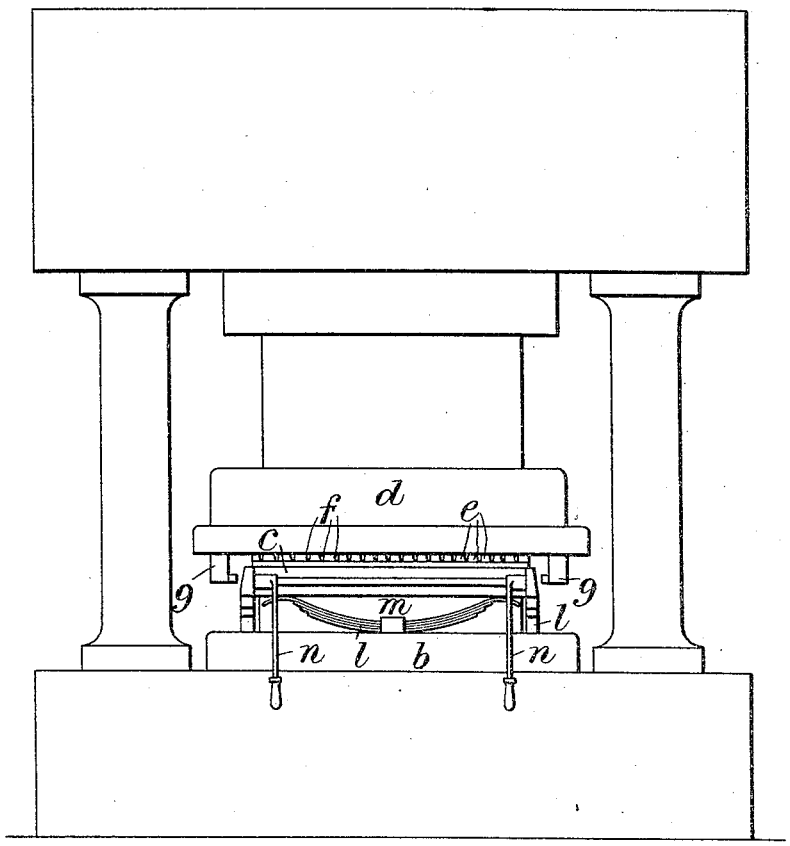
Figure 4:
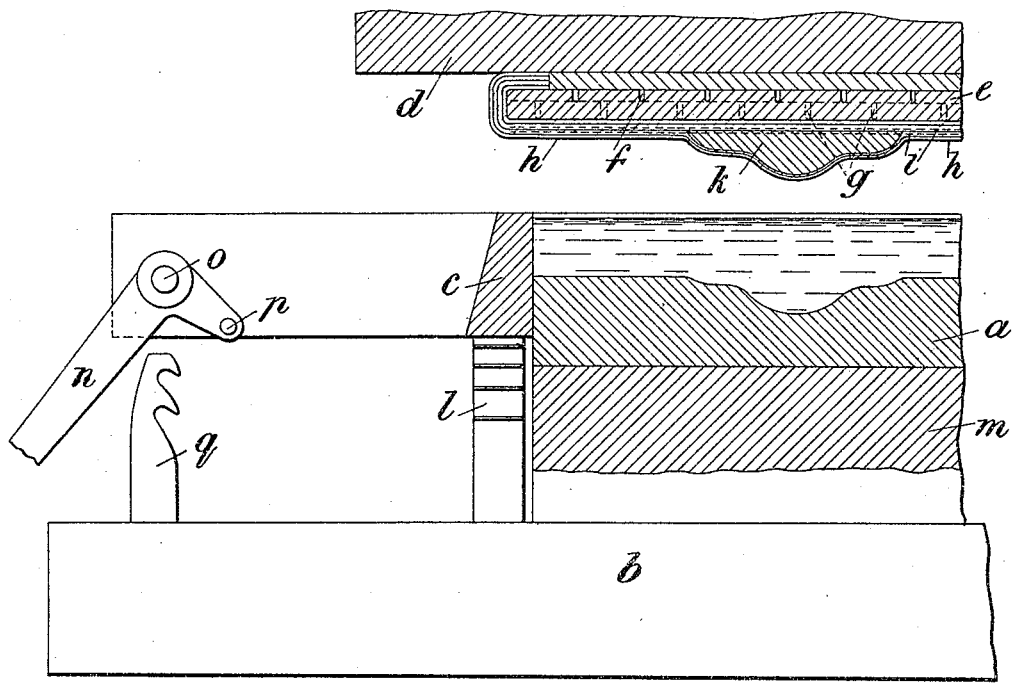
Figure 5:
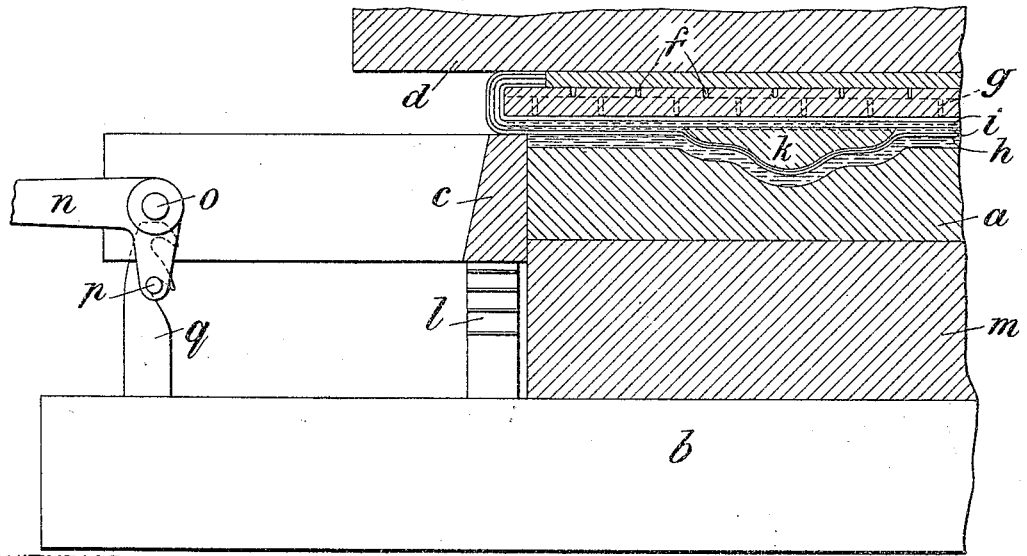
Figure 6:
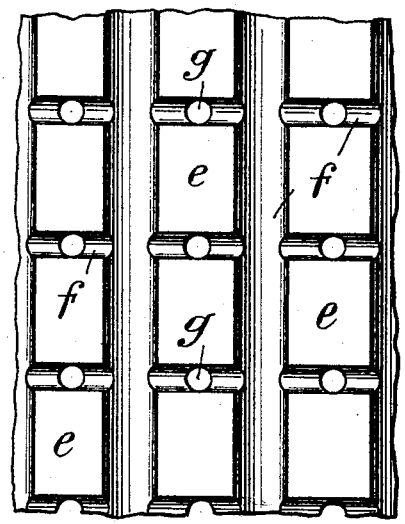
Figure 7:
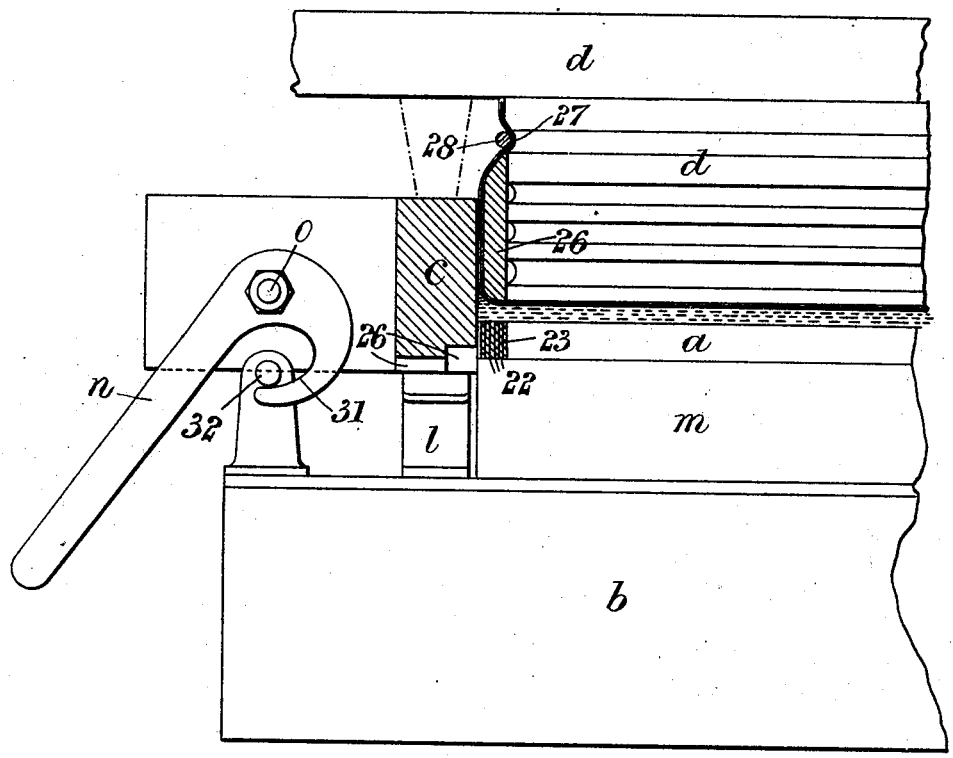
Figure 8:
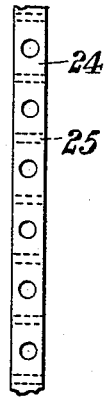
Figure 9:
Figure 10:
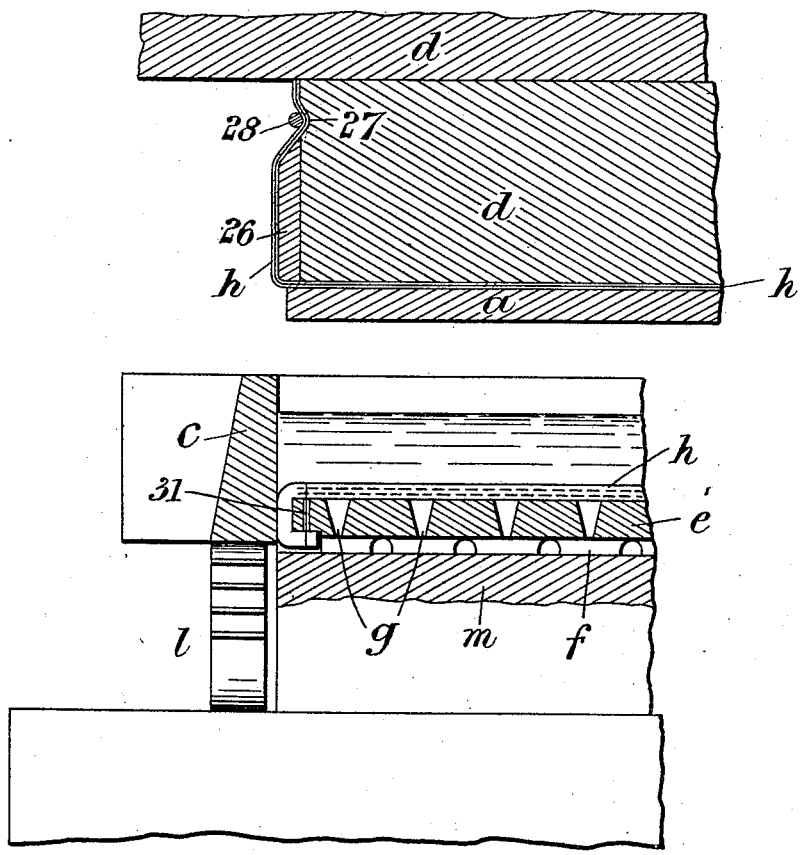
Figure 11:
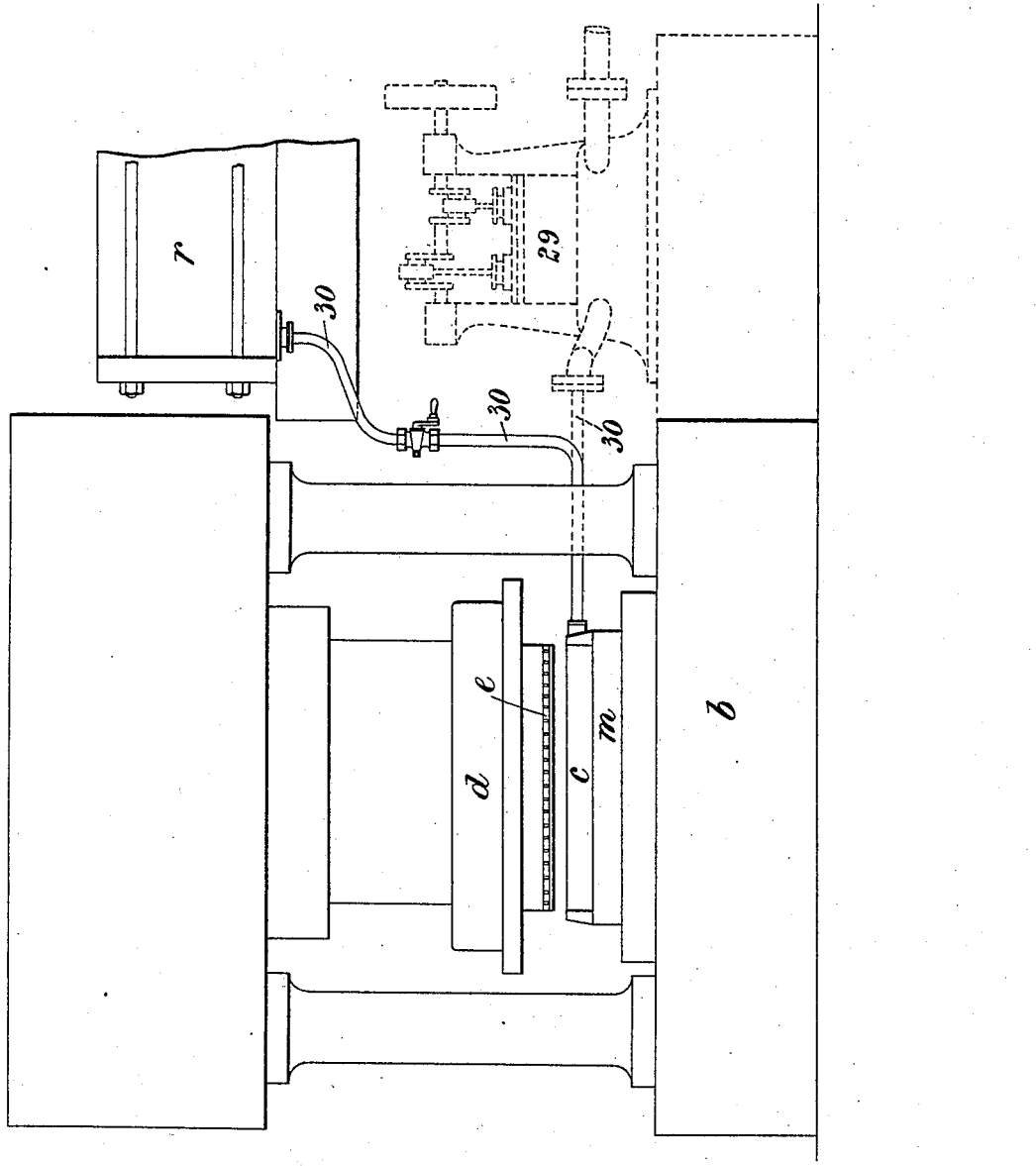
Figure 12:
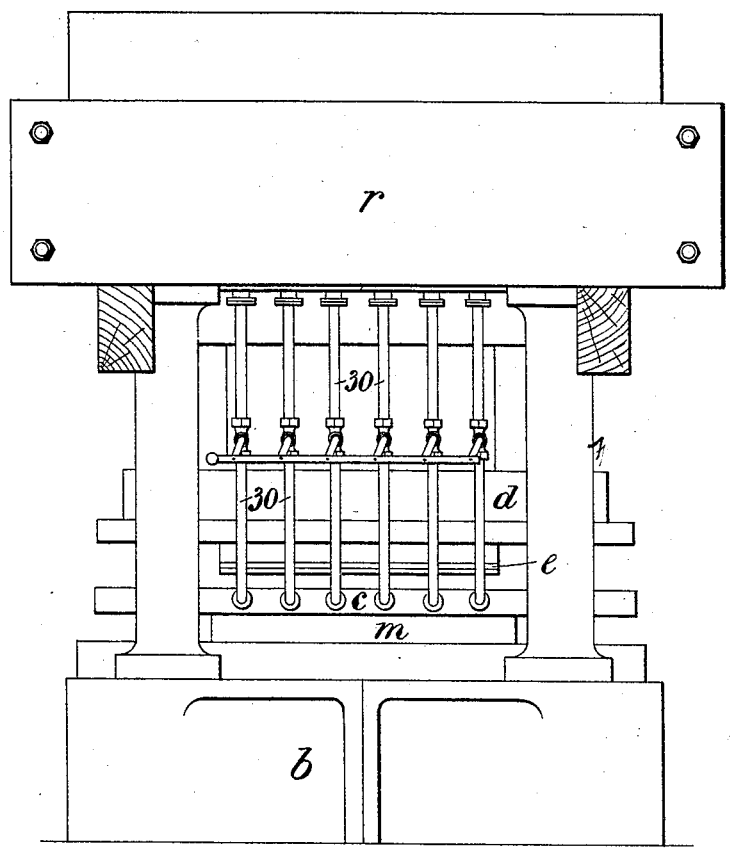

In the accompanying illustrative drawings, Figures 1, 2, and 3 show in side elevation and elevations of opposite ends, respectively, one form of apparatus constructed according to this invention. Fig. 4 is a sectional view to a larger scale, illustrating the means employed for pressing the pulp. Fig. 5 is a similar view to Fig. 4, but showing the parts in another position. Fig. 6 is a detail view, to which reference will hereinafter be made. Fig. 7 is a similar view to Fig. 5, showing a modified form of the pulp-pressing means; and Figs. 8 and 9 illustrate alternative constructions of a portion thereof. Fig. 10 is a similar view to Fig. 4, showing another modification of the pulp-pressing means. Figs. 11 and 12 show in side and end elevations, respectively, a modification of the apparatus illustrated in Figs. 1 to 6, inclusive.

Referring to Figs. 1 to 6, inclusive, a pattern-plate $a$, with the pattern or design face upward, is arranged horizontally upon the bed $b$ of a hydraulic press, so as to form the bottom of a mold. The pulp in a fluid condition (containing, say, seventy to ninety-five per cent. of liquid) is delivered evenly upon the face of the pattern-plate $a$, a metal frame $c$, surrounding the pattern-plate, constituting the walls of the mold and preventing the pulp from flowing off the pattern-plate. To allow the large amount of liquid contained in the pulp to pass away as the pressure is applied, while retaining the fibrous or solid portion, there is secured to the face of the press ram-head $d$ a plate $e$, that is formed with channels $f$ in its upper face and with perforations $g$ extending therefrom to its lower face, which is covered with layers of felt $h$ and woven-wire work $i$, arranged alternately, so that when the ram-head is lowered and the pulp thereby compressed the felt rapidly absorbs the liquid and the layers of wirework facilitate its passage to the plate $e$, through the perforations $g$ of which it readily passes to the channels $f$ and thence escapes at the edges of the plate. Fig. 6 shows a portion of the plate $e$ in plan. The layers of felt and wirework may be secured in position by metal clips or by stitching at the edges, as shown at 31 in Fig. 10. In order that the thickness of the material may be uniform in panels having portions in considerable relief, there may be secured to the outer layer of wirework covering the plate $e$ blocks or projections of gutta-percha or other suitable material that is not too elastic to compress the pulp and whose lower faces approximately conform to such portions of the design in such positions that the blocks will more or less enter the corresponding depressions of the pattern-plate, according to the thickness of the pulp required in the various parts of the panel. Over the lower face of the counter-mold thus formed one or more layers of porous felt are secured. In Figs. 4 and 5, $k$ represents such a block. To facilitate easy and safe removal of the pressed panel from the mold, especially in the case of panels requiring a large amount of pulp, and therefore a deep mold, the frame $c$ is so arranged that it can be depressed when or after the molding pressure is applied and can be held securely in its depressed position when the pressure is removed. In the arrangement under notice the frame $c$ is mounted upon springs $l$, and between the pattern-plate $a$ and the press-bed $b$ a block $m$ is interposed, so that the requisite space is left for the frame $c$ to descend. The frame is depressed by contact with the covered plate $e$, which extends beyond the pattern-plate $a$, although it may in some cases be arranged to be depressed by a projection or projections secured to the ram-head, as shown in dotted lines in Fig. 7. The catches for holding the frame $c$ in its depressed position each consists of a bell-crank lever $n$, mounted on a bar $o$, and one arm of which is formed as a handle, while the other arm is provided with a projecting pin $p$, adapted to engage with teeth on a vertical rack $q$, fixed to the press-bed $b$. (See Fig. 5.) The pulp is contained in a vat or pulp-chest $r$, provided with mechanically-operated agitators $s$, that tend to keep the pulp evenly mixed. In the example under notice there are five series of agitators arranged longitudinally near the bottom of the vat, the spindles $t$ of four of which are driven by gearing from the other spindle $t$, which is provided with a belt-driven pulley $v$. To deliver the pulp in a fluid condition evenly upon the face of the pattern-plate $a$ in the required volume, so that it may fill the recesses forming parts of the design in the plate, an apparatus hereinafter referred to as a "pulp-frame" is preferably employed. This pulp-frame, which is described in the specification of another application for Letters Patent being made by me, consists of a shallow tank formed with openings in its bottom through which pulp flows when the pulp-frame is caused to descend into pulp contained in the vat $r$. Plugs or stoppers close the openings so as to retain the pulp when the pulp-frame is raised out of the pulp and while it is being moved away from the vat into a position over the pattern-plate $a$. The plugs or stoppers are then withdrawn and the contents of the pulp-frame delivered onto the pattern-plate. In order to raise and lower the pulp-frame and allow it to be traversed from and to the pulp-vat $r$ and pattern-plate $a$, suitable ways 9 are secured to the press ram-head $d$, and on these ways rollers 10, carried on brackets 11, fixed to the pulp-frame, are arranged to run, the arrangement being such that, assuming the empty pulp-frame is located over the pulp-vat, as shown in full lines in Fig. 1, and the press ram-head in a raised position, upon the ram-head being lowered the pulp-frame is caused to descend into the vat $r$ and receive a charge of pulp through the openings in the bottom. When the ram-head has been completely lowered, the stoppers are inserted in the openings. When the ram-head lifts the pulp-frame clear of the vat, it is traversed along the ways 9 from the position shown in full lines in Fig. 1 to the position over the pattern-plate shown in dotted lines in Fig. 1. The ram-head is then lowered until the pulp-frame rests on the pattern-plate within the frame $c$, which has previously been allowed to resume its raised position, the stoppers are removed from the openings, so causing the contents of the pulp-frame to be quickly discharged onto the pattern-plate with an even supply of pulp upon all parts, the ram-head is then again raised, so lifting the pulp-frame, which is thereupon slid along the ways 9 until it is again over the pulp-vat. When the press-head is again lowered, the pressing of the charge of pulp upon the pattern-plate and the recharging of the pulp-frame are effected simultaneously. To facilitate removal of the pressed panel, the face of the pattern-plate is preferably brushed over with a spirit solution preparatory to receiving the charge of pulp. The hydraulic press may of course be of any suitable type. The apparatus illustrated is designed for manufacturing panels up to, say, one hundred and twenty centimeters square. The press-ram is 91.4 centimeters diameter, the approximate total pressure exerted being two million five hundred and forty thousand one hundred and nineteen kilograms.

As will be understood, the manufacture and apparatus may be modified to suit the requirements of particular cases.

Fig. 7 shows other means for facilitating the escape of liquid from the pulp as the pressure is applied. In this arrangement there is placed between the inner face of the aforesaid frame c, that surrounds the pattern-plate a, and the edges of the pattern-plate a device which will allow the liquid, but not the fibrous or solid portion of the pulp, to pass through it. The device may consist of perpendicularly-arranged strips of woven-wire work 22, alternating with strips of stout porous felt 23 or other suitable material, which will allow of the passage of the liquid, the width of these strips being equal to the thickness of the pattern-plate, or perforated strips 24, of metal, vulcanite, or other suitable material, (see Figs. 8 and 9,) may be laid horizontally between the frame c and the edges of the pattern-plate a, with interposed bars 25 arranged transversely at suitable distances apart to support the strips 24 and allow a free passage for the expressed liquid through the perforations of such strips. In order that the fibrous or solid matter of the pulp may not follow the liquid through the reticulations or perforations of the aforesaid devices, material such as paper-makers' felt or the like is arranged over the top of the aforesaid devices 24 and 25 or their equivalent, and grooves or openings 26* are made across the base of the walls of the frame c in order that the liquid as soon as it reaches the bed-plate b of the press or the packing-block m can flow away freely therethrough. In cases where the amount of pulp required for each panel is great, and consequently the amount of liquid contained therein is correspondingly great, it may be necessary to provide in addition to the means last described for allowing of the escape of liquid a layer or layers of porous felt or like material and woven-wire work secured to the under side of the ram-plate of the press, as hereinbefore described with reference to the arrangement first referred to.

Instead of laying the pattern-plate a face upward upon the press-bottom b it may be fastened face downward to the ram-plate d of the press, (see Fig. 10,) and the perforated channeled plate e arranged to form the mold-bottom b, with its channeled face downward, the upper face of this plate e being covered with layers of felt and wirework, as hereinbefore described, to drain off the liquid from the fibrous or solid portion of the pulp, the pulp being introduced between the pattern-plate a and the perforated plate e in any suitable way. In this arrangement it will be seen that the pattern-plate when pressing on the pulp is located within the frame c, and in such a case, as also in the arrangement illustrated in Fig. 7, where the ram-head enters the frame c, it is necessary to prevent pulp from passing up the sides of the walls of the frame c, surrounding the pattern-plate a or press-head. For this purpose a cushion 26, of resilient material, may be provided around the edges of the ram-plate d of the press, so that the said cushion reaches and bears closely against the said walls before any considerable pressure has been applied to the pulp, and thereby forms a barrier, preventing the passage of the fibrous or solid portion of the pulp. This cushion may be secured in place by bringing a layer of felt (or felt and wirework) from under the ram-plate and up the edges thereof, so as to inclose the cushion and forcing the said felt (or felt and wirework) into a channel or channels 27 (formed around the edges of the ram-plate above the cushion 26) by a metal or other suitable band 28 or bands, which presses or press the edges of the felt (or felt and wirework) into and secures it in the said channel or channels. In Fig. 7 the catches for holding the frame c in its lowered position are arranged to pull down the frame by hand after the pressure has been applied to the pulp, for which purpose the shorter arm of each catch-lever n is formed with a cam-face 31, adapted to work in contact with a pix 32, fixed to the press-bed b.

In some cases definite quantities of the pulp may be conveyed either directly from an elevated pulp-chest by pipes 30, as shown in full lines in Figs. 11 and 12, or by a force-pump 29, as shown in dotted lines in Fig. 11, through valve-controlled pipes 30 to the face of the pattern-plate a and preferably through perforations in the walls of the frame c, surrounding the pattern-plate a. When a force-pump 29 is used, the ram-plate of the press may be lowered, so as to leave a comparatively narrow space between the ram-plate and the face of the pattern-plate a, and the requisite quantity of pulp may be forced into this space. The force of the inflow of the pulp will help to quicken the drainage of the liquid from the pulp through the hereinbefore-described devices or their equivalents and will also press the fibers or solids of the pulp into the interstices of the design in the pattern-plate.

The hereinbefore-described manufacture will effect considerable economy, owing to its simplicity and the dispensing with some of the processes hitherto employed in making such articles and owing to the minimum of hand-labor required.

Having now particularly described and ascertained the nature of my said invention and in what manner the same is to be performed, I declare that what I claim is—

1. The process of manufacturing molded, or embossed, panels and the like, consisting in supplying pulp containing an amount of liquid sufficient to allow the pulp to flow or pass, into the recesses in a pattern plate, or plates to a receptacle in connection with a pressing device comprising an unperforated pattern-plate or unperforated pattern-plates, and means for allowing the liquid to run off while the fibrous, or solid matter, of the pulp is retained, and applying pressure so that the required molded, or embossed, panel, or the like is formed from the solid, or fibrous, matter of the pulp.

2. In apparatus for the manufacture of molded, or embossed, panels and the like from pulp containing an amount of liquid sufficient to allow the pulp to flow, or pass, into the recesses in a pattern-plate; the combination of an unperforated pattern-plate and means for retaining pulp on, or in contact with, the said plate, and a pressing device and means for allowing liquid to pass off but retaining the solid, or fibrous, matter of the pulp when pressure is applied the movable member of the pressing device being provided with ways for the travel of a device for supplying pulp, substantially as hereinbefore described.

3. An apparatus for the manufacture of molded or embossed panels from pulp containing an amount of liquid to allow the pulp to flow, or pass into recesses in a pattern-plate, comprising an unperforated pattern-plate with a design on its upper surface, a frame surrounding the edge of said pattern-plate and extending above it, said frame adapted to be moved in a direction toward the face of said plate, and a pressure-plate fitting over the edges of said plate, and means for allowing liquid to pass off but to prevent the solid or fibrous matter of the pulp passing off when pressure is applied.

In testimony whereof I have signed my name to this specification in the presence of two subscribing witnesses.

THOMAS JOHN PALMER.

Witnesses:
RICHARD TOMLINSON,
J. H. RAMSDEN.